United States Patent [19]

MacCracken

[11] 4,294,078
[45] Oct. 13, 1981

[54] METHOD AND SYSTEM FOR THE COMPACT STORAGE OF HEAT AND COOLNESS BY PHASE CHANGE MATERIALS

[75] Inventor: Calvin D. MacCracken, Englewood, N.J.

[73] Assignee: Calmac Manufacturing Corporation, Englewood, N.J.

[21] Appl. No.: 923,984

[22] Filed: Jul. 12, 1978

Related U.S. Application Data

[63] Continuation-in-part of Ser. No. 790,919, Apr. 26, 1977, abandoned.

[51] Int. Cl.³ .................. F28D 21/00; F25B 23/00
[52] U.S. Cl. .................................. 62/59; 62/430; 62/435; 126/430; 126/436; 165/18; 165/163; 165/DIG. 8; 29/157.3 R; 165/104.17
[58] Field of Search .................. 165/104 S, 163, 109, 165/18, DIG. 8; 126/430, 436; 62/430, 434, 59, 435; 29/157.3 R

[56] References Cited

U.S. PATENT DOCUMENTS

| | | | |
|---|---|---|---|
| 2,737,027 | 3/1956 | Kleist | 62/59 X |
| 3,062,510 | 11/1962 | Percival | 165/104 S X |
| 3,163,209 | 12/1964 | Shinn | 165/104 S X |
| 3,653,221 | 4/1972 | Angus | 62/59 |
| 3,960,207 | 6/1976 | Boer | 165/104 S |
| 4,054,980 | 10/1977 | Roma | 165/DIG. 8 |
| 4,091,863 | 5/1978 | Schroder | 165/104 S X |

FOREIGN PATENT DOCUMENTS 123424  6/1967 Czechoslovakia ................ 165/163

Primary Examiner—Albert W. Davis
Attorney, Agent, or Firm—Parmelee, Johnson, Bollinger & Bramblett

[57] ABSTRACT

While many materials and additives which will melt and freeze at various temperature levels for storing and releasing large amounts of heat thereby per unit volume have been disclosed, the packaging of these materials with suitable non-corrodible long-lasting heat exchange structures has been cumbersome and expensive. The present invention provides an inexpensive, high performance, non-corrodible thermal storage method and system adapted for use with heat storage materials of various compositions and adapted for use over a wide range of temperatures, including a heat exchanger which provides for phase change to occur approximately simultaneously throughout the volume of the entire storage mass and provides for the sites at which the phase change is occurring to be approximately uniformly distributed throughout the volume of the heat storage material. Problems of thermal expansion, stratification and sub-cooling are eliminated. Thermal storage methods and systems embodying the present system may advantageously be used for off-peak storage of electric refrigeration, cooling and heating as well as solar heating and other applications.

36 Claims, 9 Drawing Figures

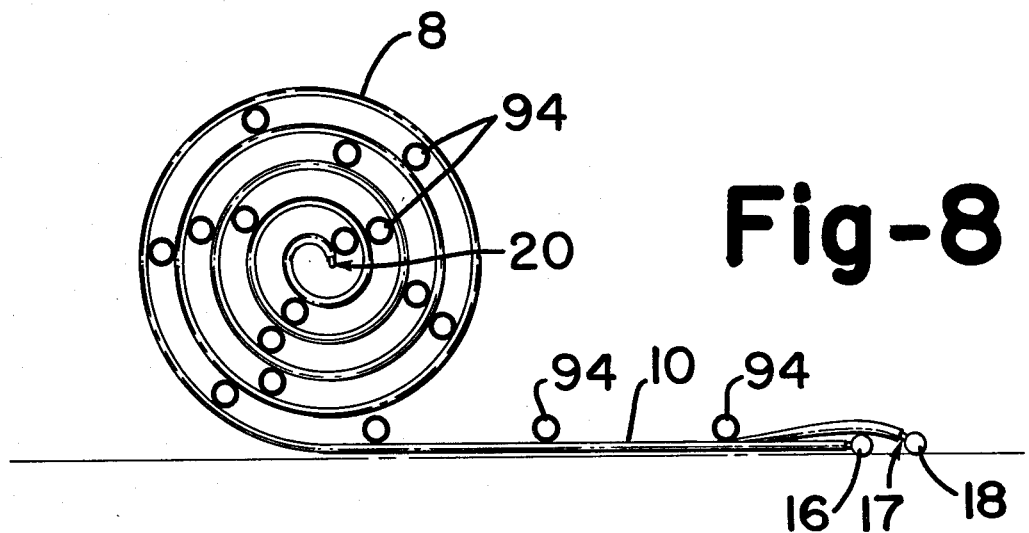
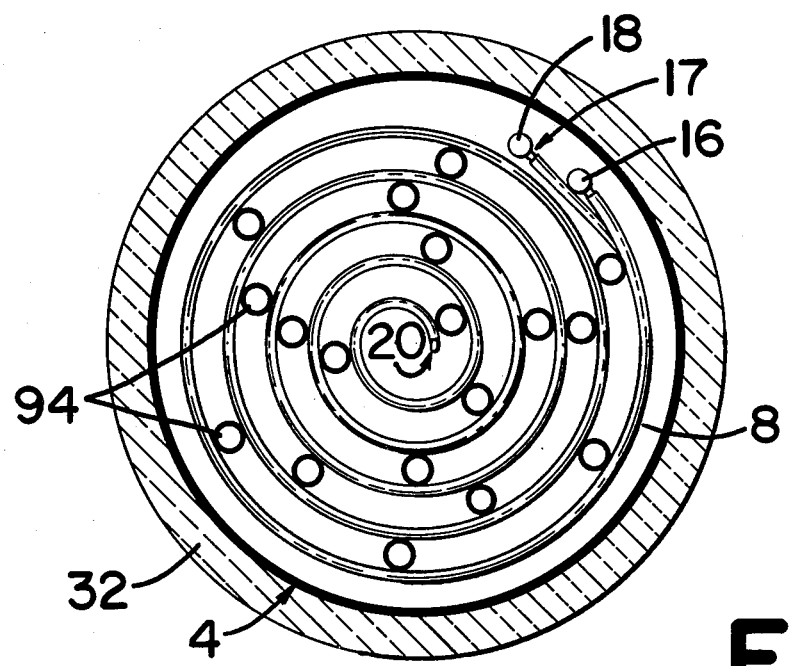

METHOD AND SYSTEM FOR THE COMPACT STORAGE OF HEAT AND COOLNESS BY PHASE CHANGE MATERIALS

RELATED APPLICATION

This application is a continuation-in-part of prior copending application Ser. No. 790,919, filed Apr. 26, 1977, and now abandoned.

BACKGROUND OF THE INVENTION

The bulk storage of heat or coolness at certain temperature levels has many applications, such as in solar heating of buildings at 85° to 120° F., in solar Rankine engines or absorption refrigeration machines at 200° to 250° F., in off-peak hour operation of air conditioners at 30° to 60° F., in off-peak hour operation of refrigeration plants at −20° to +20° F., etc. The heat storage materials used, except in the case of water at 32° F., must be carefully mixed in certain proportions with special equipment and techniques, and must be kept away from materials that will corrode. Such heat storage materials are bulky and heavy to transport, and must be used in contact with large area heat exchange devices because of the poor thermal conductivity of these heat storage materials.

In order to minimize volume, weight, and cost, heat of fusion materials with change of phase between solid and liquid have been proposed, tested and tried experimentally because 7,000 to 12,000 BTU's per cubic foot can be stored within the above narrow temperature ranges, whereas if only a liquid phase is used, such as water, capacity is limited to 2,000 to 3,000 BTU's per cu. ft. or so. These heat of fusion materials, particularly the sodium and calcium salt hydrates must have provisions to prevent stratification.

Most prior designs have used air as the heat transfer medium. Such prior art designs have been very bulky due to the required volume of the air ducts and also have required multiple encapsulation because of the requisite multiple air passages of comparatively large cross-sectional area. In certain instances, the prior art has attempted to utilize liquid as the heat transfer medium; however, such prior art arrangements have been largely limited to the freezing of water in metallic tanks, plates or tubes. However, such metallic structures suffer from corrosion and cause galvanic action which can cause rapid deterioration of various component parts. Moreover, they are expensive and inflexible, subject to damage due to expansion of the phase change material, and are heavy and difficult to transport. Other suggestions have involved multiple encapsulation with its consequent high cost.

Such prior art multiple encapsulation techniques have generally used small containers whose walls are not insulated, because the heat transfer must occur through the container walls. The uninsulated small containers are inefficient since undesired heat loss or heat inflow can readily occur through the uninsulated walls during periods of storage of heat or coolness. This problem of inefficiency of the uninsulated container is augmented by multiple small containers, because they inherently have a relatively large surface-to-volume ratio. Moreover, during the transfer of heat energy into the encapsulated containers, the PCM begins melting near the uninsulated wall of each container. The interior region of the PCM is the last to melt. Consequently, during most of a heat storing sycle, the larger proportion of the stored energy is relatively close to the container wall. In other words, a non-uniform distribution of the stored energy often exists, with more being stored, on average, near the uninsulated container wall where it is relatively easily lost to ambient. Convection of the melted PCM adjacent to the uninsulated container wall carries away heat energy during storage periods.

SUMMARY OF THE INVENTION

There are eight primary problems that have heretofore prevented the use of heat of fusion materials, or so-called phase change materials, from being used in the storing of thermal energy in a practical manner. They are cost of equipment, poor thermal conductivity of phase change materials (PCM's), corrosion, volume change during fusion, evaporation of water from salt hydrates, subcooling and stratification of such materials, and cost of shipping. The way that the present invention solves these eight problems is enumerated below.

1. Cost of equipment

The first advantage of the present invention is that it enables the use of plastic heat transfer tubing whose relatively low thermal conductivity can be compensated for by greatly increasing the heat transfer surfaces in accordance with the method and system of this invention thereby providing a large saving in cost. One or only a few plastic tanks are used instead of multiple encapsulation, thus also lowering the cost.

2. Poor Thermal Conductivity

The limitation in heat transfer rates, moreover, is not in the liquid conduit material but in the body of the phase change material. Thus, the large amount of plastic heat transfer area is matched with characteristics of the PCM by a multiplicity of small plastic liquid transporting tubes distributed uniformly throughout the entire mass of the PCM. The heat flow path at any point is thus made very short.

2. Corrosion

Corrosion is of particular importance because inorganic salt hydrates provide the necessary medium for a battery if two dissimilar metals are present in any form within the salt. Severe corrosion of the metals can result quickly. Plastics alone, including tubing, headers and fittings, or with but one non-corrodible metal such as stainless steel anywhere within the salt can be satisfactory.

4. Volume Change

The problem of volume change during fusion is greatly lessened by having a flexible plastic material for both the outer container for the PCM and for the heat transfer surfaces all throughout the PCM. They will take up any thermal expansion forces both on a large scale and also locally in connection with a particular tube.

However, an element of this invention is that the plastic tubes within the PCM are arranged so that the average temperature between the liquid in any point in any tube throughout the PCM and that in the adjoining tube is approximately the same. This is accomplished by means of multiple parallel circuits with U-bends at the end of each circuit and every alternate tube connected to a supply header and the adjoining tubes to a return header. See patent to C. D. MacCracken and Helmut Schmidt, U.S. Pat. No. 3,751,935 dated Aug. 14, 1973, for a method of creating an ice slab of uniform temperature for ice skating rinks which has since become the leading way to build an ice rink in the United States, referred to commercially as the Icemat rink.

When water is frozen to ice, which is one of the many PCM's utilized in this invention, the heat transfer liquid enters the supply header and small tubes typically at about 24° F. and leaves the small tubes and return header at about 32° F. With a small plastic tube at 24° F. adjoining one at 32° F., the average temperature is 28° F. and ice will form at a rate caused by that average temperature. Half way to the U-bends in each parallel circuit, the temperature in the supply tube will be 26° F. and the adjoining return tube, 30° F., giving the same average temperature of 28° F. At the U-bends, where the supply and return small plastic tubes are joined, the temperatures will be 28° F. in both.

Therefore, ice advantageously builds uniformly on all tubes entirely throughout the whole tank of water. The water level rises in the tank because of the increased specific volume of the ice formed but there is no sideward expansion forces as the ice joins from one spiral layer to the other because the extra water volume has been squeezed upwards previously. The rise in water level provides a measure of the extent of the fusion process. The extra water on top is the last to freeze.

Similarly, in other PCM's, the volume change is accommodated without thermal forces. Generally, it is a fact that PCM's with a melting point above 32° F. shrink when they solidify and for 32° F. and below they expand. For the PCM's that shrink when they solidify, the tank is filled with liquid phase PCM above the level of the tubes by the amount of the volume change shrinkage. When shrinkage during fusion occurs the salt advantageously stays in contact with the heat transfer surfaces because of the bulk weight which is not the case in encapsulated trays or tubes where contact is lost between the upper heat transfer wall and the salt because of shrinkage causing poor heat transfer efficiency.

5. Evaporation

Evaporation of water from salt hydrates changing their composition and thermal performance takes place even though sealed plastic walls because of the property of plastics called "water vapor transmission". This means that salt hydrates sealed into multiple small plastic containers will eventually change in performance with no way to repair this except by replacement. In the present invention, only one or at most a few, relatively large containers are used to hold the salt hydrates with removable covers, so that water may be poured in to refill the lost water evaporated up to a mark showing the proper level.

6. Subcooling

A major problem of salt hydrates is subcooling, dropping below the freezing point without crystallizing or freezing taking place. This occurs because all the crystals are melted when the salt hydrate is heated above the melting (freezing) point and these crystals are not present to seed or nucleate upon recooling. Additives have been discovered for many of the salt hydrates to promote nucleation (see U.S. Pat. Nos. 2,677,664 and 2,936,741 to M. Telkes). Another very simple method is practical in the case of the present invention where the salt hydrates with melting points above room temperature are held in a few large insulated tanks. A very small projection from the tank outside of the insulation keeps the salt hydrates in this projection, or finger, from melting when heat is applied. Thus, the frozen crystals are present at all times and will nucleate crystallization when the salt hydrate is cooled below its freezing point. For example, the velocity of crystallization of sodium thiosulfate pentahydrate is about one inch per minute, so a 4 ft. diameter tank nucleates throughout in an hour or less when cooling is provided by the heat transfer liquid.

7. Stratification

Another problem of salt hydrates which this invention overcomes is the stratification of solid crystals which, being heavier, in the case of most salt hydrates, sink to the bottom. They often nucleate into different hydrate molecule combinations as they fall through warmer areas. Because of incongruent phase change in these different hydrate molecules, the overall composition is changed and consequently the performance. Also, a permanent precipitate forms at the bottom. One solution to this has been to limit the vertical dimension to an inch or so. In the present invention, a straw-like mat of rubberized hair or other insert low density matting is used as a spacer between the tubes. This effectively fills all the space in the tank with such small openings like a filter that there is no room for crystals to fall through. In addition, since the dual tubing averages the temperature uniformly throughout, the crystal growth will be also uniform throughout and there will be no temperature differences to cause large crystal build-ups in one area over another.

In a presently preferred embodiment of the invention, a small, inexpensive, low-power circulating pump and conduit apparatus serve to keep the melted phase change material in circulation within the relatively large heat storage tank. Thus, stratification does not occur.

8. Shipping Cost

An average solar heated house is required to store one million BTU's, and at 100 BTU's per pound, five tons of PCM is needed and must be shipped. The present invention provides for the PCM to be shipped in heated tank trucks and pumped through a hose in liquid form into the lightweight tanks and heat exchange tubing units which have been previously installed and tested. It is well known that use of tank trucks is a much more economical method of transporting and delivering large volumes of liquid to many delivery points than by sealed containers.

BRIEF DESCRIPTION OF THE DRAWINGS

The invention may be better understood by reference to the drawings.

FIG. 8 is an elevational view of the flexible tubing grid being rolled up using tubing spacers as an alternate to the use of matting as shown in FIG. 2; and FIG. 9 is a sectional plan view of the spiral tubing grid made in accordance with the procedures shown in FIG. 8 and installed in a thermally insulated tank.

DETAILED DESCRIPTION OF PRESENTLY PREFERRED EMBODIMENTS

Figure 1:
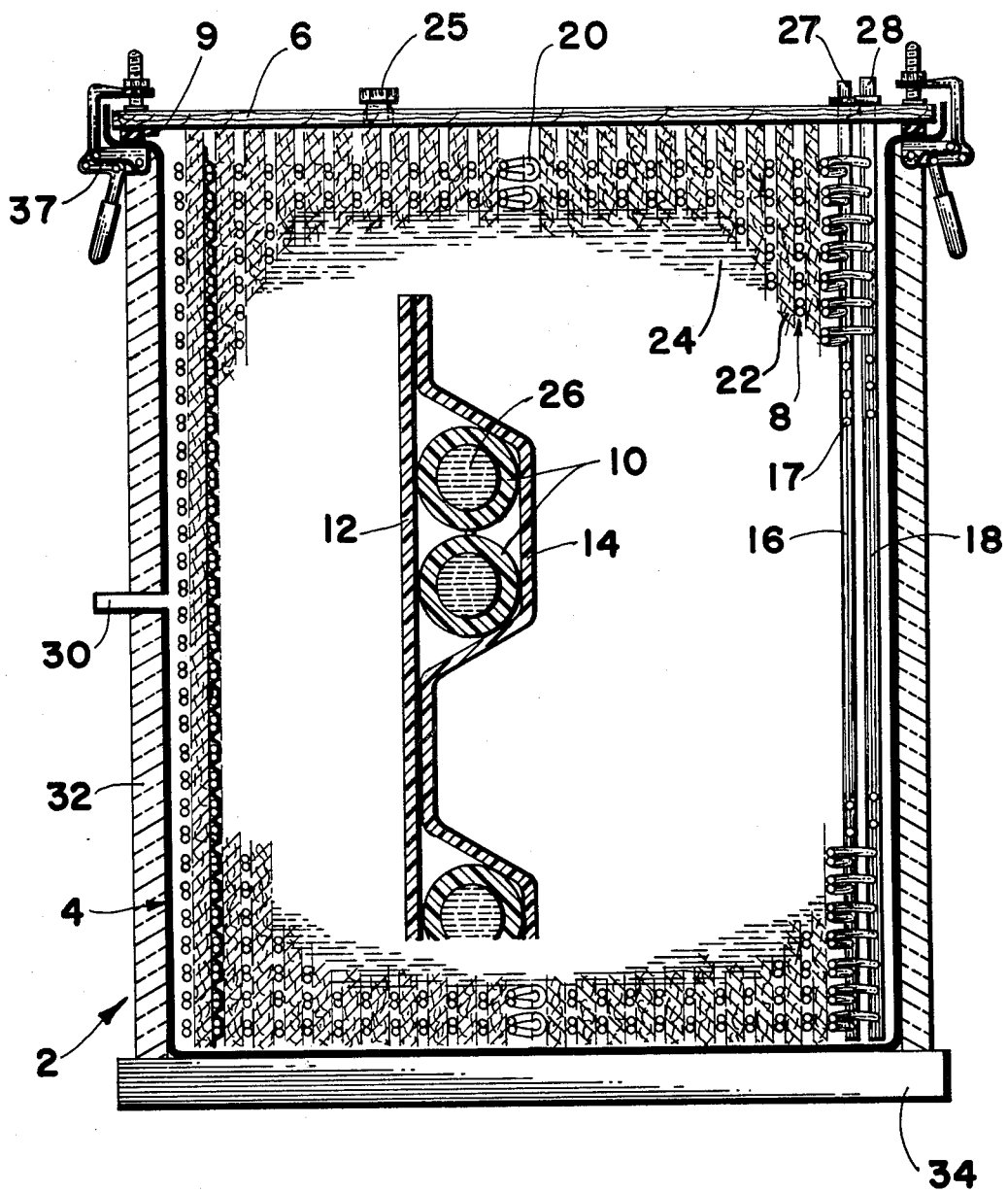
FIG. 1 is an elevational view of the thermal storage device showing a cylindrical, open-top tank with spiral tubing and spacer mats in cross section.

Referring now to the drawings in greater detail, FIG. 1 illustrates a phase change thermal storage unit 2 which stores and releases a large amount of heat and coolness per unit volume by virtue of the heat capacity of the phase change materials. There are many phase change materials and additives which, when phase change takes place, release a large amount of heat during freezing and absorb a large amount of heat during melting. Examples of such PCM's are indicated further below.

The thermal storage device 2 consists of a semi-flexible walled open-top tank or container 4 which preferably is made of thermoplastic material to provide flexibility and resistance to corrosion, an important factor. Most phase change materials (PCM's) are corrosive to metals.

Prior to filling the tank with PCM 24, a preformed roll of a flexible tubing mat 8 and rubberized hair 22 are placed in the tank. This roll of mat 8 and spacing means, for example a mat 22 of rubberized hair, fill the space in the tank, so that no region within the entire tank is more than a short distance away from the mat tubing which carries the heat transfer liquid 26 for heating (melting) and/or cooling (freezing) of the PCM. The heat transfer liquid 26 may be water, or if used below 32° F. (0° C.), an antifreeze solution must be utilized, such as ethylene glycol mixed with water. The flexible tubing mat 8 is prefabricated in the factory using extruded twin tubings 10 of small diameter, for example having an inside diameter of approximately one-quarter of an inch, usually made of synthetic plastic material, for example such as ethylene vinyl acetate (EVA), which are kept closely spaced and parallel to one another by means of a spacer strip assembly which consists of a rigid plastic strip 12 and a flexible plastic strip 14 attached together in such a way that they form tight pockets for twin tubings 10.

Figure 2:
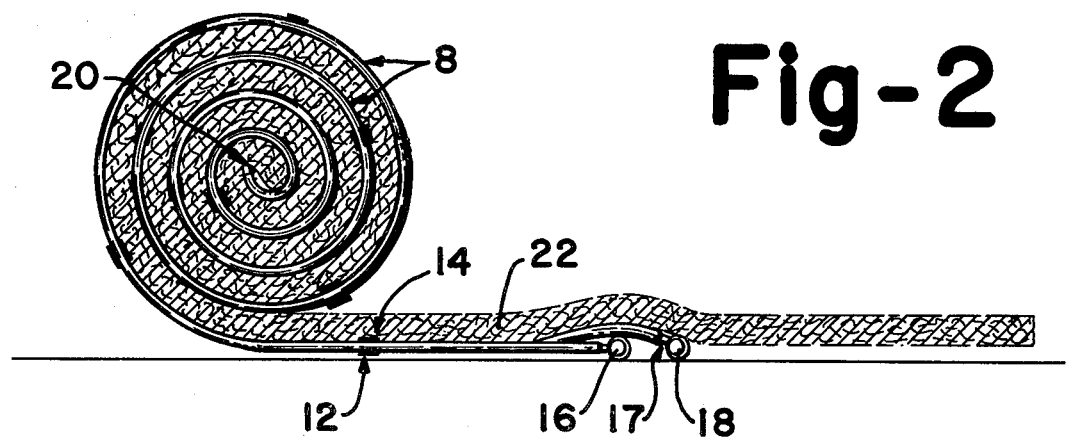
FIG. 2 is an elevational view of the flexible tubing grid and spacer matting being rolled up into a heat exchanger assembly.

A more popular method of pre-forming this grid of mat 8 prior to rolling it up is by heat sealing. For uses involving temperatures too high for common plastics, synthetic rubber or elastomeric compounds, may be used such as EPDM (ethylene propylene diene terpolymer). A number of twin tubings or dual tubes 10 (number of tubings is dependent on the width of the mat grid, a popular width is 4 ft. nominal which includes 32 twin tubings spaced approximately one and a half inch from the centerline of one pair of tubes to the centerline of the next pair) are placed at a given spacing and arranged parallel to one another. A rigid vinyl strip 12 is placed under the twin tubings 10 and a flexible vinyl strip 14 is placed over the twin tubings 10 in such a way that it is located right over and aligned with the rigid strip 12. These two strips 12 and 14 are then heat sealed together between the dual tubes, so that they form supporting loops or pockets 15 around the respective twin tubings. As seen in FIG. 2, the supporting strips 12 and 14 are positioned at approximately evenly spaced locations along the length of the grid-like flexible tubing mat 8 and are heat sealed together as described above before the mat is rolled up in order to provide support for the twin tubings 10, as seen enlarged in FIG. 1. These mats 8 may be fabricated to any desired length. At one end of the mat 8, two headers are installed,—one is supply header 16, and the other is return header 18. On the other end of mat 8, the 'U' bends 20 are installed for interconnecting the tubing ends.

Figure 3:
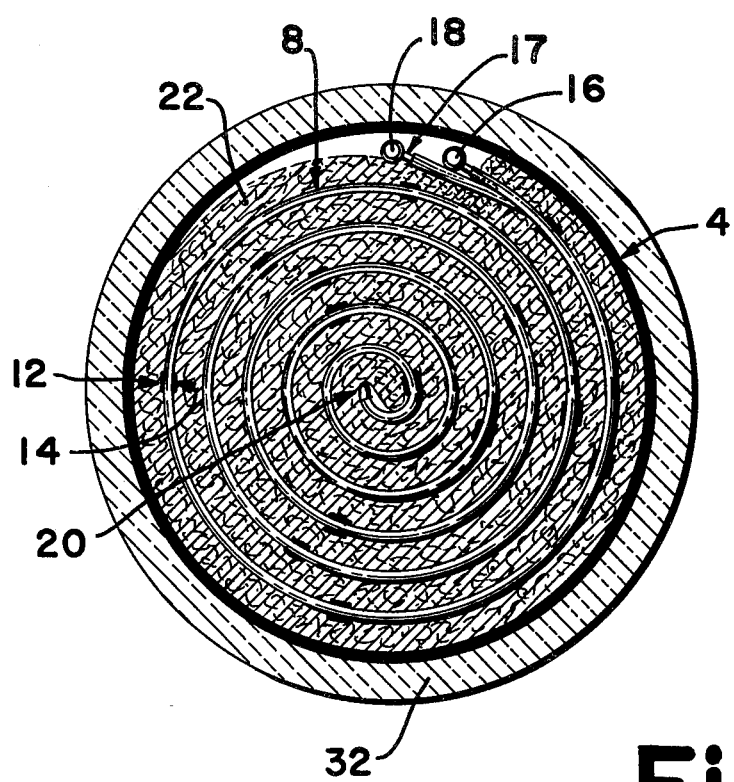
FIG. 3 is a sectional plan view of the spiral tubing grid and spacer matting rolled up and installed in the thermally insulated cylindrical tank.

Referring to FIG. 2, the flexible tubing mat 8 and spacing means 22 shown as rubberized hair matting are rolled together by laying out a long table, a longer length of the rubberized horse hair matting 22 on top of the flat extended flexible tubing grid 8. Then a roll is formed starting from the 'U' bend end of the mat keeping the starting circle as small as possible (about 2"–4" diameter). When one completes the rolling process, a roll is formed which has alternate layers of the flexible grid of tubing 8, and a spacer medium in the form of a flexible fibrous low density material having relatively large spaces between fibers, for example, a rubberized hair 22 is used like in pole vault and high jumping landing pits. This spacer means 22 serves to space apart the successive convolutions of the rolled-up flexible grid-like tubing mat 8. The supply header 16 and return header 18 are on the outside of the resulting roll, but as can be seen in FIG. 3, an extension of the layer of spacer matting serves to separate the tubing from the tank wall. This roll is then installed in the tank 4. Two ports are provided in the tank wall for inlet connection assembly 27 and an outlet connection assembly 28 which are connected to the supply header 16 and return header 18 by means of known piping and plumbing methods. For large tanks more than one tubing mat 8 may be placed end-to-end for the rolling procedure shown in FIG. 2, and rolled up in one large roll. It is preferred to use a plurality of such tubing mats 8 in one large roll rather than using a single mat of greater length, so as to limit the pressure drop of the heat exchange liquid 26 circulating in the tubing.

The device 2 is filled with a suitable PCM 24 in accordance with the temperature requirements of the application. The tank 4 is kept covered using a clamped plywood or plastic cover 6 and gasket 9 as a prevention against dust accumulation, evaporation and contamination of the PCM 24, and also to keep the light weight buoyant heat exchanger from raising up out of the often heavier density PCM when in the liquid state. The cover clamps are shown at 37, and a removable plug 25 is shown in the cover. Insulation 32 is provided all around the tank 4. The tank 4 is also provided with a nucleating element in the form of a tubular conduit which protrudes outside the insulation 32 and is exposed to ambient temperature. The purpose of nucleating device 30 is to retain some frozen crystals of the PCM 24 while all the PCM 24 inside the tank 4 is in molten state. These trapped crystals in the nucleating device 30 are very helpful in initiating the crystallization of the PCM for avoiding subcooling. It is a tendency of the liquefied PCM, when there are no crystals present within the material, that it becomes subcooled, which is undesirable because it delays the phase change and reduces its effectiveness.

FIG. 3 shows a sectional plan view of FIG. 1, to show how the spacer matting is located with respect to the tubing grid 8. Depending upon the heat transfer cycle time for charging and discharging the PCM storage material, a thinner or thicker matting may be selected with subsequent change in length of tubing grid and matting. Details of this are discussed later. From the description of FIG. 1, the details of the elements may be understood.

Figure 4:
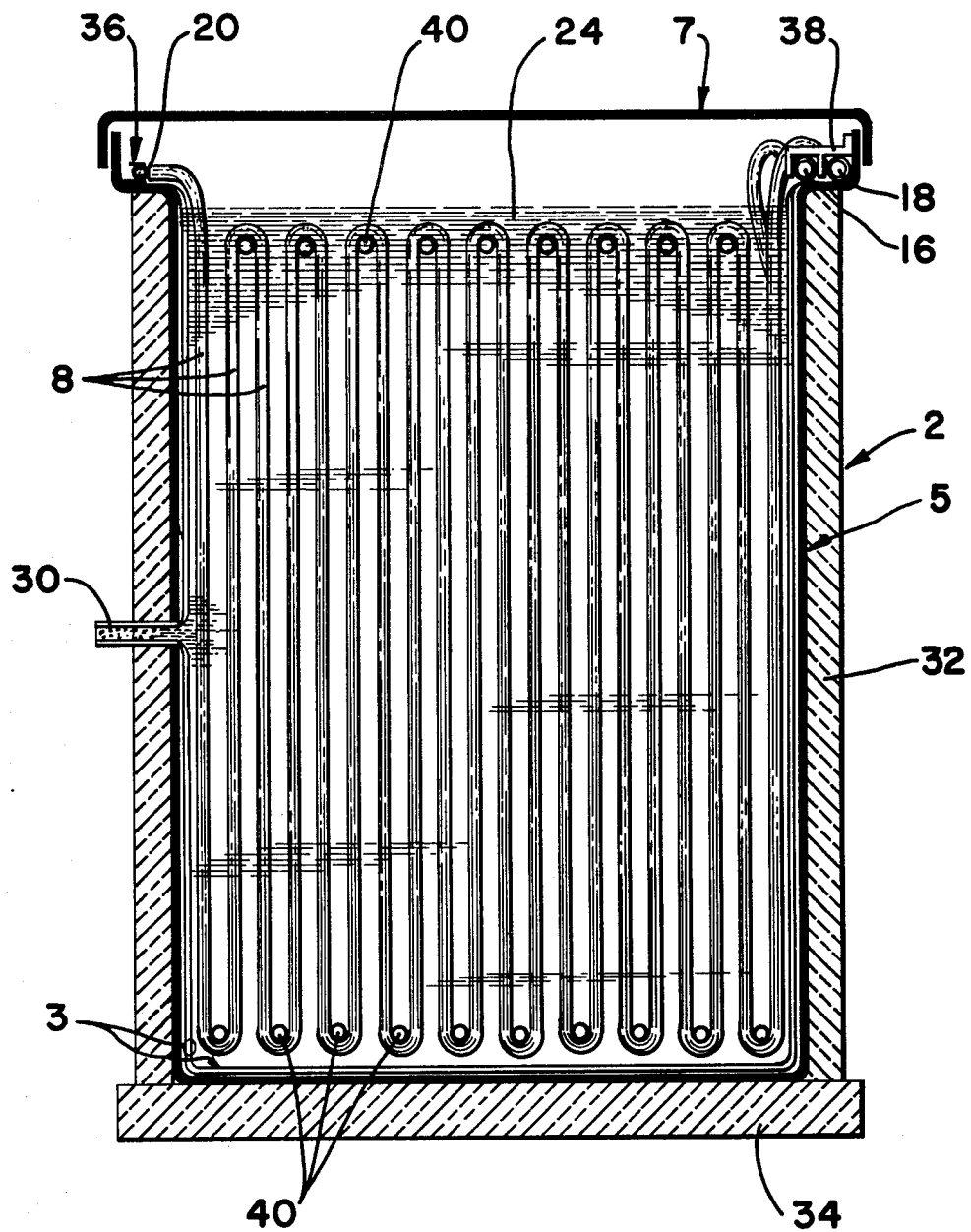
FIG. 4 is an elevational sectional view similar to FIG. 1 of the thermal storage apparatus showing a rectangular tank with tubing mats tensioned around spacer bars and running up and down vertically.

FIG. 4 illustrates another thermal storage device 2. The device includes a rectangular tank 5 which is preferably made of a thermoplastic material which thereby provides its quality of being semi-flexible and resistant to corrosion to various chemicals used as PCM's. However, the tank may be metallic, particularly if the PCM is water, and a plastic liner or coating is used over the metal. The rectangular design of the tank 5 facilitates the use of flexible tubing mat 8 without the use of spacer material throughout the length of the mat 8. The mat 8 is installed differently by festooning the mat up and down around the spacer rods 40 which are installed in two rows, one near the top of the tank 5 and the other near the bottom. In each row spacer and support rods 40 are equally spaced, for example at approximately 1½" to 6" center-to-center distance and are arranged parallel to one another. Supply header 16 and return header 18 are located on the flange in the upper portion of the tank 5 where they are secured in place by header holding clips 38 which are shown attached to the flange wall of the tank 5. The other end of the mat 8 which has 'U' bends 20 is located on the flange of the upper portion of the tank on the opposite side from the headers. The 'U' bends 20 are secured in place on the flange by using an anchor strip 36 which has the same number of hooked fingers as the 'U' bends. After assembly, the tank 5 is filled with the PCM 24. The tank 5 has a cover 7 to prevent evaporation and contamination by falling foreign matter but need not be the clamped cover of FIG. 1, because the tubing assembly is anchored by spacer rods 40. The tank is located on an insulated surface 34 and is well insulated all around with insulation 32. A nucleating device 30 extends through the insulation 32 outside the tank. As described under FIG. 1, this nucleating device 30 retains some crystals while all the other PCM 24 is in molten state inside the tank 5. These trapped crystals in the nucleating device 30 help start the freezing cycle without undergoing subcooling.

Figure 5:
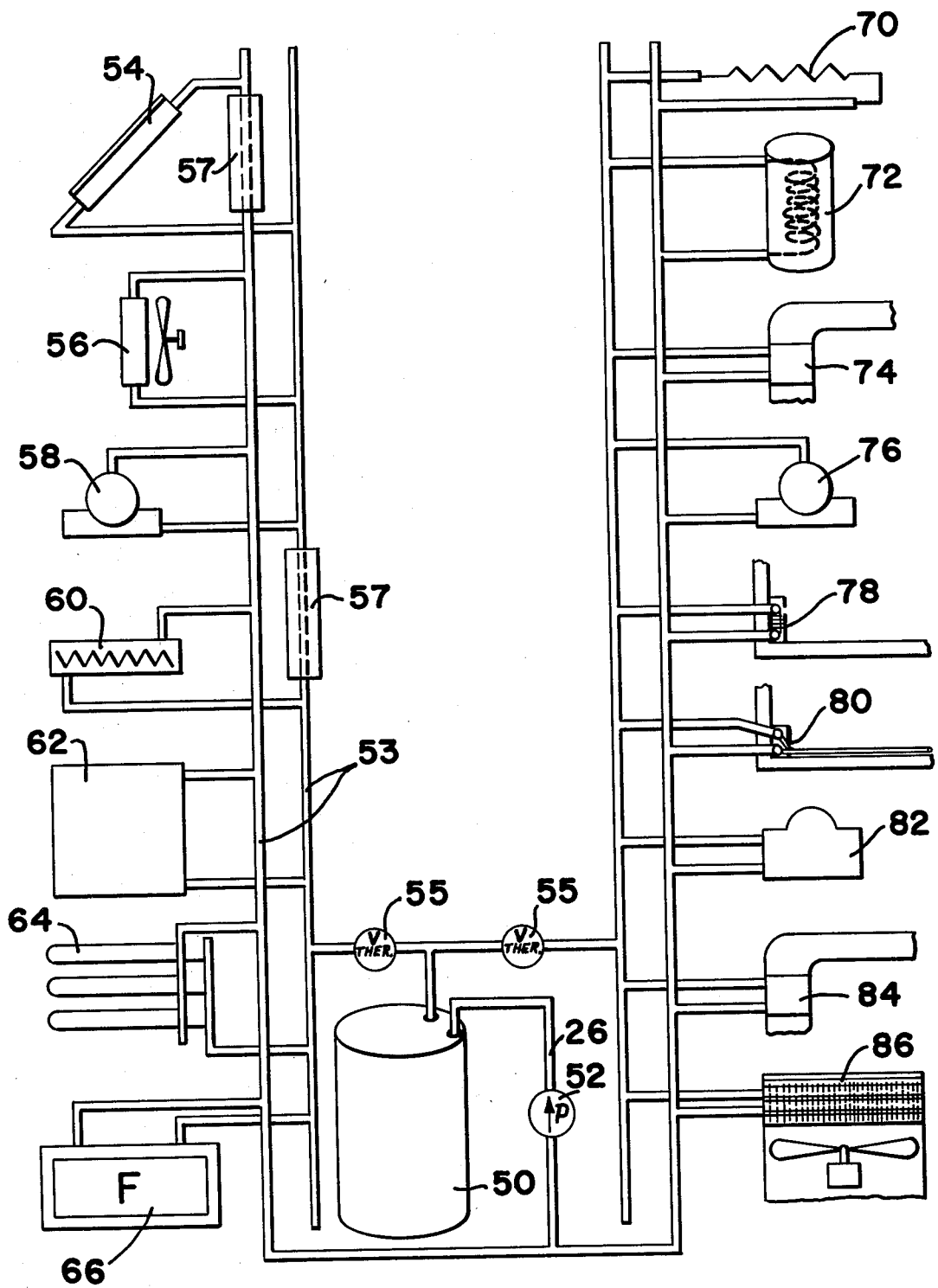
FIG. 5 shows a schematic circuit diagram illustrating a thermal storage apparatus connected by piping to a pump, heat input and output devices.

FIG. 5 shows a schematic diagram of a thermal storage system with a tank 50 containing a PCM for storing thermal energy by the latent heat of fusion, a pump 52 for pumping heat transfer liquid 26 through multiple small tubes 8 and 10, as shown in FIG. 1, and a variety of heat input devices on the left side and heat output devices on the right side connected with piping 53 and valves 55; some of the valves are not shown because it will be understood by those skilled in the art how to select various piping circuits to and from the respective heat input and heat output devices by valving. FIG. 5 depicts an illustrative system only in which many different heat input devices and heat putput devices are shown for purposes of explanation. In any given installation, only the particular desired input and output devices are included, as will be understood. The valves 55 are shown as being thermally actuated, and the respective temperatures at which they become actuated, i.e. opened and closed, are selected in accordance with the operating temperature range of the respective heat input devices and heat output devices utilized in that given installation. Also, as will be explained in detail hereinafter, the PCM to be used in the heat storage tank 50 is chosen, so as to have a melting temperature which is suitable for the particular heat output device and input device being utilized. For example, a radiant floor heater 80 has a relatively great effective area and, therefore, operates to advantage when the liquid 26 being circulated is heated to a moderate temperature by the PCM in tank 50. On the other hand, a baseboard heater 78 has a much lesser effective area and, therefore, operates to advantage when the liquid 26 being circulated is heated to somewhat higher temperature by employing a PCM in the tank 50 which melts at a correspondingly higher temperature. This selection of a PCM having a melting temperature suitable for a particular installation having particular heat input and output devices will be explained further by specific examples.

For example, starting at the top left and proceeding down are shown examples of heat input equipment: solar collector 54, air coil 56, heat pump 58, electric resistance liquid heater 60, fossil fuel boiler 62, ice skating rink grid 64, and cold storage or freezer room 66.

Starting at top right and proceeding down are shown examples of heat output equipment including: agricultural or industrial process heater 70, water heater 72, heating coil in air duct 74, heat pump 76, radiant baseboard heater 78, radiant floor heater 80, Rankine engine 82, absorption air conditioner 84, and air coil or cooling tower 86.

The various heat input devices shown at 54-66 may all be used to melt a PCM in tank 50 selected for the appropriate temperature level of that heat input device. For example, solar collector 54 may heat fluid 26 to 130° F. as it is being pumped through collector 54 on its way to tank 50. Pipe insulation 57 prevents substantial change in temperature of liquid 26. The reader will understand that such pipe insulation 57 should be distributed throughout the system but is omitted to simplify the drawing. In tank 50 solid PCM sodium thiosulfate pentahydrate, which melts at 118° F., will begin to melt by taking heat from fluid 26, dropping its temperature from 130° F. or slightly less to perhaps 125° F. as it leaves tank 50 and is pumped back to collector 54. After several hours, the length of time depending on the total area and spacing of small tubes 8 and 10, the PCM will be totally melted except for what is in nucleating device tube 30 (FIG. 1).

The heat stored in the above example in tank 50 by a PCM which melts at 118° F. may be pumped via liquid 26 to various heat outlet devices on the right side when desired by suitable valve operation. For example, the heating coil in air duct 74 may be selected and heating provided thereby to a structure, not shown, in the usual manner by warming of air which is then circulated through air ducts in the building structure which is to be heated. Or water heater 72 may be heated by fluid 26. Similarly, the agricultural or process heater 70 may be heated by circulating the warm heat transfer liquid 26, for example for an agricultural use, such as for performing grain drying, or the floor radiant heater 80 may be heated by circulating the warm liquid 26.

If a higher temperature PCM were selected, for example such as trisodium phosphate dodecahydrate which melts at 150° F., or magnesium chloride hexahydrate which melts at 243° F., solar collector 54 could be utilized advantageously to supply heat to heat output devices such as the baseboard radiant heater 78, Rankine engine 82, and absorption air conditioner 84.

Heat pump 76 could be best utilized for example with a PCM which melts at 32° F., such as water or a PCM which melts at 55° F., such as sodium sulphate decahydrate mixed with chloride salts as discussed in Maria Telkes U.S. Pat. No. 3,986,969.

In other words, such a PCM having a relatively low melting temperature in the range of approximately 32° F. to 55° F. is advantageously used to heat the liquid 26 which, in turn, serves for supplying heat to the evaporator of the heat pump 76.

In similar manner, the other heat inputs may be advantageously connected through heat storage tank 50 to many of the heat outlet units. One example of each will be mentioned.

Air coil 56 can be used to melt ice in tank 50 created by operation of heat pump 76.

Heat pump 58 can be used during night off-peak hours to melt at 118° F. a PCM in the tank 50, which will, in turn, provide heat during the day to air coil in duct 74 or to radiant floor heater 80.

Electric heater 60 can supply heat to melt a PCM at 150° F. in tank 50 during off-peak hours to be used during the day in baseboard radiator 78.

Fossil fuel boiler 62, undersized for direct heating application in a church, can store heat ahead of time in tank 50 and release it into the church on Sunday morning through radiant heater 80.

Ice rink 64 can be kept frozen during peak daytime hours by coolness stored, for example in a PCM melting at 12° F., such as 22% ethylene glycol and water, which was frozen the previous night by operation of heat pump 76.

Cold storage room 66 may similarly be kept cold by storing coolness from the heat pump 76 during off-peak hours.

Cooling tower 86 can be operated at night to freeze at 55° F. a PCM and thereby supply air conditioning through air coil 56 in the daytime.

There are many other combinations for which thermal storage may be used. It will be understood that there may be multiple heat inlets and multiple outlets which may be interconnected in various cross combinations. FIG. 5 illustratively shows only some of the possible heat input and heat output equipment that might be advantageously used.

Figure 6:
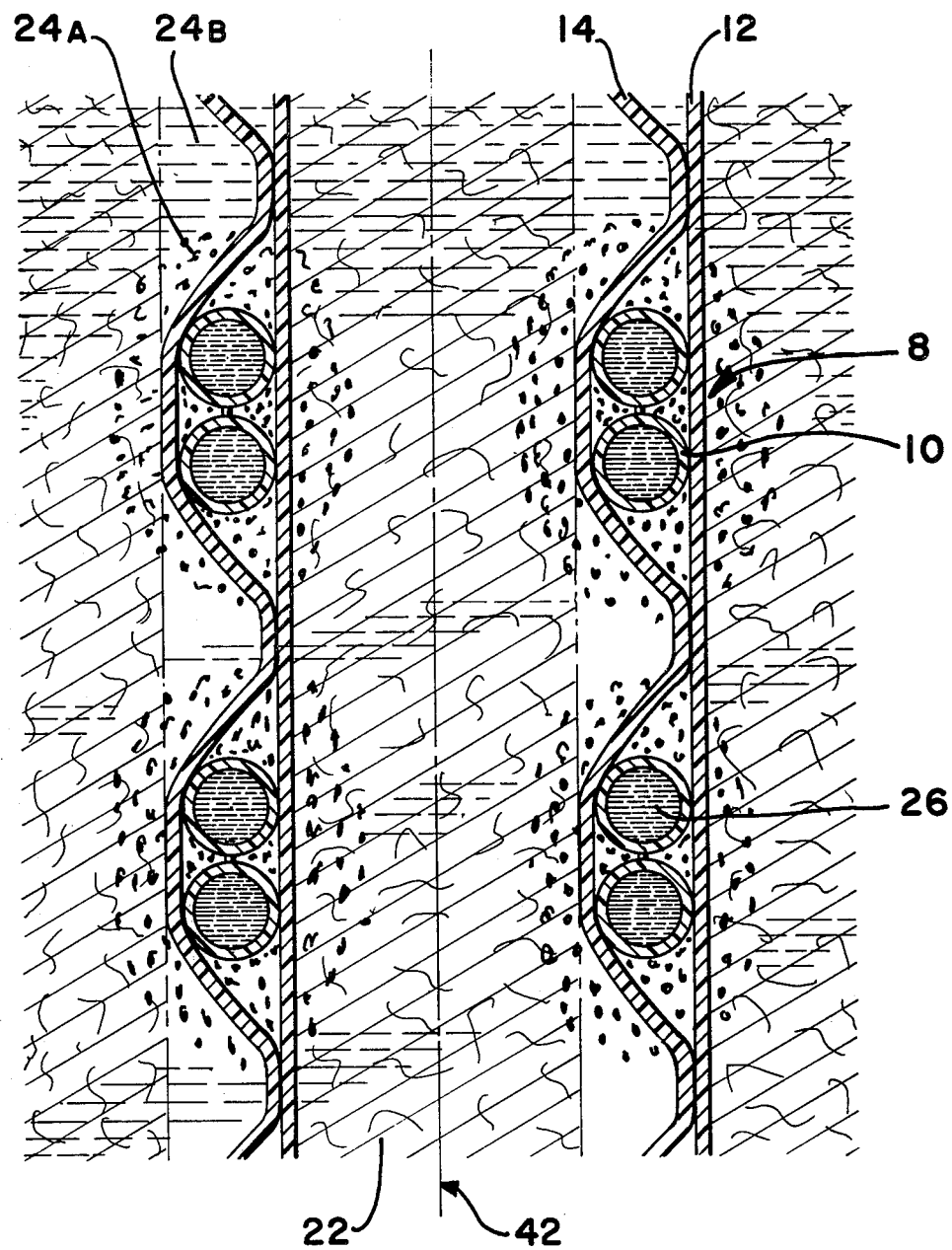
FIG. 6 shows an enlarged partial sectional view of a portion of the apparatus of FIG. 1 showing tubing, spacer material and phase change material in a partially frozen condition.

FIG. 6 is an enlarged cross-sectional view of a section of the thermal storage device 2. The section shows two layers of mat 8 spaced apart approximately 1" by rubberized hair 22 which has an open wiry appearance. Rubberized hair has very large air spaces within the matted structure and actually leaves most of the space for PCM 24 while also keeping the layers of mat 8 spaced properly. The flexible tubing mat 8 is factory fabricated using small diameter twin tubings 10 which are extruded out of thermoplastic material suitable for a wide range of temperature and is corrosion resistant.

Areas 24A of PCM denote the frozen crystals around the tubes during a discharging cycle when the PCM is giving up heat. Areas 24B between the tubes show the melted unfrozen part. During a charging cycle this would be reversed. Heat domain divider line 42 denotes the location equidistant between the tubes where the heat flow divides between the domain of each tube. It should also be noted that whichever of the tubes 10 of each pair is connected to inlet header 27 will have more frozen PCM surrounding it during a discharge cycle because it is colder and will have more melted PCM surrounding it during a charging, heating cycle. FIG. 6 is shown near the halfway point (close to the U-bends) so little difference in temperature is noted, and thus the frozen PCM 24A will be fairly symmetrical.

It is to be understood that the charging or freezing period involves solid PCM being around the tubes and melted PCM being out halfway between the tubes, while the melting period involves melted PCM around the tubes and frozen PCM at the halfway point. Since liquid can transfer heat by conduction and convection; that is, moving around within its melted space, while solid PCM can only transfer by conduction, the freezing-up period will take longer than the melting period except in those cases where the solid salt may have a greater conductivity than the combined effect of the liquid conductivity and convection.

Prior researchers have found that stratification, as described under the foregoing list of problems, may also be greatly reduced by agitation or stirring. (See U.S. Pat. No. 2,677,664, dated May 4, 1954 to Maria Telkes.) This agitation or stirring is not feasible when salts are encapsulated in multiple containers nor in tanks not designed for it.

I have found that in my cylindrical tank, heat storage unit 2, with a depth of about 4 or 5 feet and a diameter from 2 to about 6 feet, that pumping the liquid salt, when it is above its fusion temperature, down through a central vertical conduit tube located in the center of the heat exchanger spiral roll provides a strong recirculation that keeps molten mixture nearly uniform throughout for preventing stratification.

Figure 7:
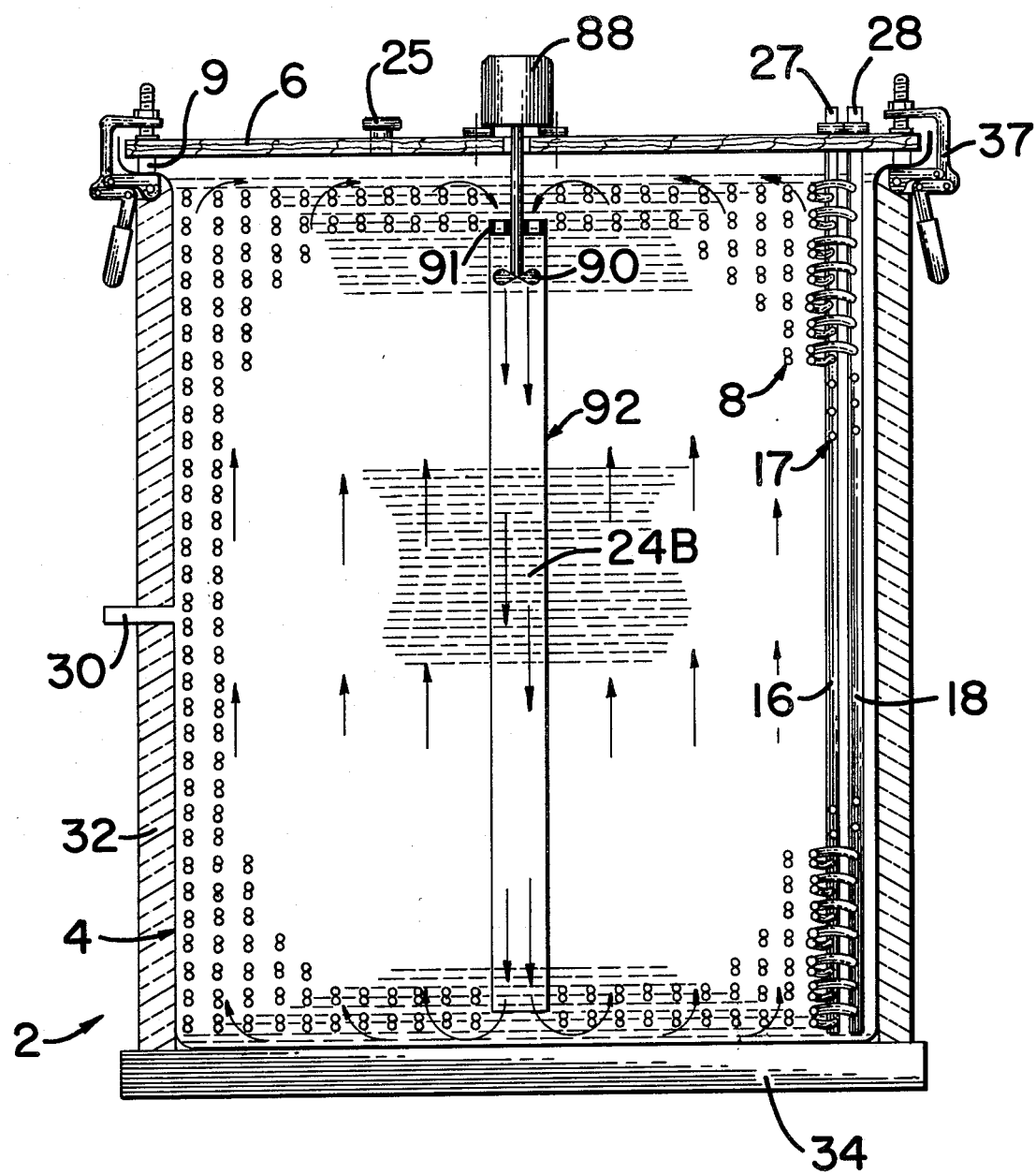
FIG. 7 is an elevational view of the thermal storage device similar to that shown in FIG. 1 but with a circulating pump for preventing stratification.

FIG. 7 shows a vertical shaft column pump 88 having its motor mounted on cover 6 at the center of the cover with an impeller 90 designed to pump liquid salt 24B vertically downward through conduit tube 92. The central conduit 92 may be used as a rolling core about which the roll of the tubing mat 8, together with its spacer means, is rolled up. The lower end of this conduit 92 is spaced from the bottom of the tank 4 by a suitable spacing, for example by a distance in the range from approximately one-half of the inside diameter of conduit 92 to one and a quarter of said inside diameter. The top end of the conduit tube 92 is spaced below the level of the liquid heat storage salt 24B by a distance comparable to the spacing of its lower end above the bottom of the tank. The motor for the pump 88 is shown as a small electric motor having its shaft directly connected to the propeller impeller 90. Above the impeller is a shaft bearing support 91, such as a spider, attached to the upper end of the conduit 92 and having multiple passageways as shown for the liquid to pass down through the bearing support 91. The liquid (melted) salt 24B flows downwardly through the conduit 92 pumped by the action of the propeller impeller 90, and at the bottom of tube 92 the flow spreads outward over the bottom of tank 4 and rises uniformly by recirculation to the top of the conduit tube 92 where it reenters the top of this conduit and is again pumped downardly by the impeller 90.

The recirculating flow insures that the percentage mixture of water and salt will be and will remain uniform throughout the tank during the liquid (melted) condition of the PCM, so that subsequent crystallization will be the same throughout.

As an example of the stratification problem which is thereby avoided, it is noted that in sodium thiosulphate pentahydrate (melting at 118° F. when pure or at 115° F. in a suitable commercial form containing some impurities) there is a tendency when melted for an excess of water to rise to the top of its container. The resulting scarcity of water at the bottom tends to cause formation of a crystal with less water, namely, the higher melting point dihydrate form, rather than the desired pentahydrate crystal. Moreover, this tendency toward stratification with an excess of water rising to the top of the container is a progressive phenomenon. Thus, upon each successive melting and re-freezing cycle, more and more of the undesired dihydrate crystal tends to collect at the bottom of the container and more and more water tends to collect at the top, until dihydrate crystal precipitate occupies about one-third of the entire volume of the material. Similar stratification problems are encountered with other compositions of PCM, as indicated above and as described in the introductory portion of this specification.

Such stratification will not happen when the liquid (melted) PCM is circulated within the tank 4 by pumping it in the manner as shown. An electric switch may be used for automatically turning the electric motor of the pump 88 on and off at the appropriate times.

In view of the fact that it is desirable to assure that the circulation pump 88 be extremely reliable in operation over long periods of time, there is an advantageous pump arrangement which may be used so as to obtain a very high degree of reliability. The electric motor is a relatively low power single-phase alternating current motor of the shaded-pole induction type. Such a shaded-pole motor has a relatively small starting torque and a relatively considerably increased operating torque when it is running at normal operating speeds.

Consequently, there is no need to use any on-off switch. The shaded-pole motor is continuously energized with alternating current, thereby avoiding any possible problems with switching it on and off. When the PCM becomes solidified around the impeller 90, the motor stalls and remains stalled until the PCM becomes melted around the impeller. By virtue of the low starting torque of the shaded-pole motor, it does not strain against the solid-bound impeller and does not become over heated. Very little electric power is wasted. As soon as the localized volume of the PCM immediately surrounding the impeller has become melted, the impeller automatically begins to rotate again as driven by the continuously energized motor, regardless of how long it may have been bound by the solid (frozen) condition of the PCM.

FIG. 8 shows the grid-like flexible tubing mat 8 being rolled up with an alternate less expensive form of spacing means than the matting 22, shown in FIG. 2. Plastic spacing members 94, shown as tubes of relatively large diameter or plastic pipes are secured to the twin tubings 10 of the flexible mat 8 by adhesive or heat sealing or mechanical fastening. The spacing members 94 extend transversely to the length of the tubing mat 8 and are spaced at intervals of approximately 1 to 3 feet. They constitute a simple spacing means which is easily fabricated and assembled.

FIG. 9 shows the rolled-up tubing grid with the tubing spacers 94 (FIG. 8) installed in tank 4. Insulation 32, headers 16 and 18, tubing nipples 17, and U-bends 20 are the same as shown in FIG. 3. Spacer tubes 94 may thus serve to replace the support strips 12 and 14 as shown in FIGS. 2 and 3. Consequently, the tubing mat 8 comprises the twin tubings 10 supported by the spacer members 94.

The twin tubings 10 each may have an inside diameter (ID) in the range between approximately one-eighth of an inch and approximately three-eighths of an inch. It is to be understood that the tubing passages may be oval shaped, if desired. In the illustrative examples discussed above, the I.D. of each of the pair of tubes 10 is approximately one-quarter of an inch.

EXAMPLE

I. An electric utility company introduces an off-peak rate of $0.060 per KWH for 10 A.M. to 10 P.M. and $0.015 from 10 P.M. to 10 A.M. A small office building uses 20 tons of chilled water air conditioning at 44° F. from 9 A.M. to 6 P.M. during the summer season. The following will show the storage equipment embodying the present invention which is required and how much operating cost is saved.

Ice at 32° F. provides 44° F. water with a 12° differential. The amount of ice required is computed as follows:

(a) 12 hours $\times$ 20 tons $\times$ 12,000 BTU's per hour per ton $\div$ 144 BTU's per pound of ice $\div$ 56 pounds ice per cubic foot requires 357 cubic feet of ice in the PCM tanks 50 or 50A. A 6 ft. diameter plastic tank five feet high is a practical maximum size and this holds 120 cubic feet up to a 4¼ ft. level. Therefore, three 6 ft diameter tanks are required.

The spacing of the plastic tubes within the ice must be such that all the ice be melted in 9 hours and all the water refrozen in 12 hours, because there is a time period described above when the rates are low. The spacing determines the total heat transfer area and thus the length of the spiral tubing mat to be installed in the tank.

I have found that 14 BTU/hr/sq.ft./°F. can be transferred from an ice slab on both sides of the mat up to 1" thick.

Assuming an average temperature differential of 4° F. when freezing the ice, it would mean the chilled antifreeze solution would enter at about 24° F. and leave at 32° F. with an average of 28° F. A refrigerant suction temperature of about 18° F. produces this desirable temperature pattern.

The calculation, then, is as follows:

$$\frac{20 \text{ tons} \times 12,000 \text{ BTU/hr/ton}}{14 \text{ BTU/hr/ft}^2/°F. \times 4° F.} = 4,286 \text{ sq. ft.} \quad (b)$$

and with mats 4 ft. wide, this means 4286/4 = 1072 running ft. of mat located in three 6 ft. diameter tanks. Such tanks have a combined cross-sectional area of 85 sq. ft. The spirally coiled mats take up substantially the whole space in the cylindrical tanks. Thus, each coil path has a width of 85/1072 = 0.079 ft. or 0.95 in. Therefore, 1072 running feet in the three tanks provide 357 running feet per tank.

I have found out that pressure drop considerations as a practical matter limit mats to about 90 ft. in length. Thus, you install more than one mat in each tank, 4 mats per tank each 89 ft. long, or 12 89 ft. mats in all. The spacer material would be 0.95" less the width of the mat which is 0.31", thus about ⅝". An alternative is to use 6 mats 60 ft. long which would raise the cost because of more headers and U-bends but would reduce pressure drop, allow for more flow, and provide faster response.

The present operating cost of the office building air conditioning equipment would be about:

$$\frac{\$.06/\text{KWH} \times 12,000 \text{ BTU/hr/ton}}{746 \text{ BTU/KWH} \times 3.0 \text{ C.O.P.}} = \$.32/\text{ton-hr.} \quad (c)$$

Assuming that this small office building is operating 25 weeks, 5 days per week at 50% of full load 9 hours per day, the calculation is as follows:

(d) 25×5×9×0.5×20=11,250 ton-hrs., or $3,600 cost.

Since the refrigerant suction temperature will be lower because the freezing of the ice, about 18° F. vs. 34° F. for chilled water, the C.O.P. (coefficient of performance) of the chiller heat pump can be assumed to be about 2.5 instead of 3.0. The cost is calculated as follows:

$$\frac{\$.015 \times 12,000}{746 \times 2.5} = \$.096/\text{ton-hr} \qquad (e)$$

and for 11,250 ton-hrs., the cost would be $1,080. A savings of $2,520 per year, or a savings of 70%, compared to operating without storage in the small office building.

II. Example II using sodium thiosulfate pentahydrate, a phase change material, PCM-118, which melts at 118° F., or 115° F. in this case because of certain impurities, is to store heat for one cloudy day and two nights during 30° F. average temperature weather in a house that takes 50,000 BTU's/hr at 0° F. Since the design base is 65° F., 35/65×50,000, or 26,923 BTU's per hour for 40 hours, or 1,076,920 BTU's must be able to be stored.

With 92 BTU's per pound latent heat and 18 BTU's per pound sensible heat between 100° F. and 135° F., 1,076,920 BTU's divided by 110 BTU's per pound shows that 9,790 pounds of salt are required.

Since salts are more conveniently loaded at the factory into tank or tanks 50, the weight of loaded containers is a factor, and a practical limit of about 1,000 pounds for shipping and moving into a house basement is assumed. PCM-118, with a specific gravity of 1.6, will store over 100,000 BTU's and weight about 1,000 pounds in a plastic container 2 feet in diameter and 4 feet high.

Ten such tanks 50 are needed for this example, providing about 1,100,000 BTU's. Heat transfer liquid from the solar collectors at about 130° F. enters the tank tubing leaving at 116° F. for an average of 123° F., =8° F. above the fusion point of 115° F. Opposite from the other example, charging the tank 50 involves melting liquid around the tubes first which speeds heat transfer by convectional motion of the liquid.

Assuming two sunny days to charge the tanks with heat, assuming 900 BTU's per square foot per day from the collectors, and assuming 25,000 BTU's per hour are needed to heat the house during the 8 hour sunny days, then 1,276,000 BTU's would be needed along with 1,476,000/900×2=820 sq. ft. of collector. The charging time is 16 hours (the two 8 hour solar days) and the discharging (freezing) time is 40 hours.

Since PCM-115 has a thermal conductivity about ⅓ less than ice, an overall coefficient of about 5 BTU/hr/ft²/° F. from each side is reasonable, or 10 overall when the salt is solid. The partially liquid phase should be higher but can be assumed to be the same. The calculation for the mat area would be:

$$\frac{1,076,000 \text{ BTU's}}{\frac{10 \text{ BTU}}{\text{hr ft}^2 \text{° F.}} \times 8° \text{ F.} \times 16 \text{ hrs}} = 840 \text{ sq. ft.}$$

and with 4 feet high mats, it would mean 210 running feet divided into 10 tanks, or 21 feet length per mat. Since the ten tanks 50 are each 2.0' diameter, their area is 3.14 sq. ft., and 3.14 sq. ft./21 ft.=0.150 ft. or 1.8 in. is the width of each coil path of the spiral. Subtracting the mat thickness of 0.3 in., the spacer material is 1.5" thick.

It is to be noted that since the salt shrinks as it freezes, the molten salt should more than cover the tubes and the frozen salt will be totally within the height of the tubes in tank 50.

The headers 16 are made of ABS (acrylonitrile butadiene styrene) or CPVC (chlorinated polyvinyl chloride) plastic pipe with ABS or CPVC nipples 17 solvent cemented to the headers for low cost, adequate heat resistance and elimination of corrosion. The mat tubing is a medium or high density polyethylene with butyl rubber additive for flexibility to aid in making tight sealing joints. Stainless steel U-bends and stainless steel tubing clamps are the only metal in contact with the salt to avoid galvanic action.

In the above example of the house, it was mentioned that the PCM heat storage tanks could be located in the basement. It is to be understood that such thermally insulated tanks can be mounted outside of a house or other building on a suitable foundation, such as a concrete pad.

EXAMPLES OF PCM's

Listed below are the various PCM materials which I have found to be useful and economically feasible, together with their respective approximate melting points. As indicated above, the practical commercially available materials may contain minor amounts of impurities which may slightly change the melting points, and so the following listing is to be understood from a practical point of view:

| PCM | Approximate Melting Temp. |
| --- | --- |
| Water and Ethylene Glycol Mixture | This PCM will cover the temperature range from 32° F. down to −15° F., or lower, depending upon the relative proportion of ethylene gylcol in the mixture. |
| Potassium Chloride 80% water by wt. 20% salt by wt. | 12° F. |
| Sodium Sulphate Decahydrate, or mixed with one or more of: Potassium Nitrate Sodium Chloride Ammonium chloride Potassium Chloride | Sodium Sulphate Decahydrate melts at about 89° F. As explained in M. Telkes Pat. No. 3,986,969, the range from 40° F. to 89° F. can be covered by mixing it with one or more of the salts listed in the appropriate proportions. |
| Disodium Phosphate Dodecahydrate | 97° F. |
| Sodium Thiosulphate Pentahydrate | 118° F. |
| Trisodium Phosphate Dodecahydrate | 150° F. |
| Magnesium Chloride Hexahydrate | 243° F. |

EXAMPLES OF HEAT TRANSFER LIQUIDS

For use below 32° F., a mixture of water and an antifreeze such as ethylene glycol.

For use from 32° F. to about 210° F., water.

For use above the boiling point of water, there are a number of commercially available heat transfer liquids. Ethylene glycol can be used up to about 320° F. There is Dowtherm heat transfer liquid available from Dow; Therminol heat transfer liquid available from Monsanto; and Caloria heat transfer liquid available from Exxon, and so forth.

Another Example of Cold Storage

Another example of an application where off-peak cold storage can be used to advantage is for chilling the freezer cases in a supermarket. The PCM material which can be used effectively for this application is potassium chloride hexahydrate which melts at 12° F. A suitable quantity of this material is frozen overnight when reduced costs for electrical power are available. Then, during the daylight hours, when electrical rates are higher, a mixture of water and ethylene glycol is used as the heat transfer liquid to chill the various freezer cases.

The examples given are illustrative of various applications that may be made of phase change material thermal energy storage according to my invention. These examples are not to be thought of as limiting as to any particular use, dimension, or material. It is intended that various modifications which might readily suggest themselves to those skilled in the art be covered by the scope of the following claims.

I claim:

1. In a heat exchange system capable of transferring the heat of fusion between a moving liquid and a stationary liquid/solid phase change material:
   A. a tank formed of a material capable of withstanding constant temperatures above and below the melting point of any phase change material within said tank;
   B. a grid of closely-spaced, small-diameter flexible plastic tubes arranged to give multiple parallel liquid circuits with opposite direction of flow of the liquid in adjoining tubes;
   C. said grid including a plurality of vertical layers of said closely-spaced flexible plastic tubes, said liquid flowing in the opposite direction in adjoining tubes in each layer;
   D. spacer means to provide generally uniform horizontal spacing of said layers of plastic tubes throughout said tank;
   E. a phase change material substantially filling said tank and surrounding said grid of uniformly spaced tubes;;
   F. liquid supply and return headers connected to said grid of plastic tubes;
   G. heat supply means for adding heat to said system;
   H. heat removal means for withdrawing heat from said system; and
   I. pumping means for recirculating a liquid through said tubing grid, headers, heat supply means and heat removal means, whereby said phase change material may be alternately melted and frozen uniformly throughout the mass of said phase change material as heat is added to and withdrawn from said system.

2. In a heat exchange system capable of transferring the heat of fusion between a moving liquid and a stationary liquid-solid phase change material as claimed in claim 1, in which the plastic tank is cylindrical with a top opening.

3. In a heat exchange system capable of transferring the heat of fusion between a moving liquid and a stationary liquid-solid phase change material as claimed in claim 1, in which the phase change material is pumped into the tank in liquid phase after the tank has been located for its position of use.

4. In a heat exchange system capable of transferring the heat of fusion between a moving liquid and a stationary liquid-solid phase change material as claimed in claim 1, in which the spacer means consists of a noncorrodible loose light-weight matting rolled up with the grid of plastic tubes into a spiral roll.

5. In a heat exchange system capable of transferring the heat of fusion between a moving liquid and a stationary liquid-solid phase change material as claimed in claim 1, in which the outer surface of the tank is insulated.

6. In a heat exchange system capable of transferring the heat of fusion between a moving liquid and a stationary liquid-solid phase change material as claimed in claim 5, in which the phase change material extends in a narrow projection out through the outer wall and outer insulation so that some of the phase change material will not melt when heat is added to the system thus preserving frozen crystals for nucleation purposes when heat is being extracted from the system.

7. The method of storing thermal energy and withdrawing it at a later time comprising the steps of:
   A. providing a plastic open-top container;
   B. uniformly spacing a grid of small diameter plastic tubes within and substantially throughout said container;
   C. arranging said tubes to give multiple parallel circuits with opposite direction of flow in adjoining tubes;
   D. connecting said tubes to supply and return headers;
   E. substantially filling said container and surrounding said tubes with a phase change material in its liquid state while leaving a region in the top of said container which is free of said phase change material for accommodating the expansion and contraction of said material during its change of state;
   F. connecting said headers through pumping and heat exchange means;
   G. recirculating a liquid through said tubes at a temperature below the phase change temperature causing the phase change material to solidify; and
   H. alternately adding heat energy to and withdrawing heat energy from the recirculating liquid causing said material to melt and solidify simultaneously throughout the mass of said phase change material, whereby heat of fusion will be stored simultaneously throughout the phase change material during solidification and then released to the recirculating liquid simultaneously throughout the phase change material during melting.

8. The method of storing thermal energy and withdrawing it at a later time as claimed in claim 7, in which the plastic tank is cylindrical and said grid has a spiral configuration as seen from above with generally uniformly spaced vertical layers of vertically spaced tubes and the direction of flow is opposite in neighboring tubes in each layer of said spiral configuration for providing generally uniform temperature averaging throughout the mass of phase change material.

9. The method of storing thermal energy and withdrawing it at a later time as claimed in claim 8, in which the spacer means consists of a non-corrodible loose light-weight matting rolled up with the grid of plastic tubes into a spiral roll.

10. The method of storing thermal energy and withdrawing it at a later time as claimed in claim 7, in which the outer surface of the tank is insulated.

11. The method of storing thermal energy and withdrawing it at a later time as claimed in claim 10, in which the phase change material extends in a narrow projection out through the outer wall and outer insulation so that some of the phase change material will not melt when heat is added to the system thus preserving frozen crystals for nucleation purposes when heat is being extracted from the system.

12. The method of storing coolness and subsequently releasing it for use at a later time in air conditioning, refrigeration, and process functions comprising the steps of:
  A. providing an open-top container;
  B. uniformly spacing a grid of small diameter flexible plastic tubes within and substantially throughout said container;
  C. substantially filling said container and surrounding said tubes with a phase change material (PCM) in its liquid state while leaving a region in the top of said container free of PCM for allowing room for expansion and contraction of the PCM during its change of phase;
  D. arranging said tubes to give multiple parallel circuits with opposite direction of flow in adjoining tubes in said tank for providing generally uniform heat energy transfer into and out of said grid of flexible plastic tubes throughout the volume of said PCM;
  E. connecting said tubes to supply and return headers;
  F. connecting said headers through pumping and heat exchange means;
  G. recirculating a liquid through said tubes at a temperature below the phase change temperature of said PCM causing the PCM to solidify; and
  H. at a later time when cooling is desired recirculating a liquid through said tubes at a temperature above said phase change temperature causing said liquid to be cooled and said PCM to melt, whereby the latent heat of fusion will be withdrawn from the PCM, enabling the storing of coolness in the solid state, and subsequently the heat of fusion will flow from the recirculating liquid to the PCM thereby cooling said liquid.

13. The method of storing coolness and subsequently releasing it for use at a later time in air conditioning, refrigeration, and process functions as claimed in claim 12, in which the tank is cylindrical and has the multiple parallel circuits lying horizontally.

14. The method of storing coolness and subsequently releasing it for use at a later time in air conditioning, refrigeration, and process function as claimed in claim 13, in which the spacer means consists of a noncorrodible loose light-weight matting rolled up with the grid of plastic tubes into a spiral roll.

15. The method of storing coolness and subsequently releasing it for use at a later time in air conditioning, refrigeration, and process function as claimed in claim 12, in which the outer surface of the tank is insulated.

16. In a heat exchange system capable of transferring the heat of fusion of a stationary liquid/solid phase change material between a moving liquid in said system and said phase change material, apparatus comprising:
  A. an insulated tank formed of a material capable of withstanding temperatures above and below the melting point of any phase change material within said tank;
  B. at least one grid of closely-spaced small diameter flexible synthetic conduits arranged within said tank to give multiple parallel liquid circuits through which said liquid can flow;
  C. a phase change material substantially filling said tank and surrounding said grid of synthetic conduits with a region at the top of said tank being free of said phase change material for accommodating expansion and contraction thereof in the tank;
  D. said grid of flexible synthetic conduits being arranged for flow of liquid in opposite directions in neighboring pairs of conduits in said grid for providing generally uniform transfer of heat energy between the liquid in the respective pairs of conduits and the phase change material throughout said tank;
  E. spacer means in said tank associated with said grid for providing substantially uniform horizontal spacing of said synthetic conduits and permitting free flow of the phase change material in its liquid state throughout said tank;
  F. liquid supply and return headers connected to said grid of synthetic conduits for conducting said liquid into and out of said conduit grid;
  G. heat supply means for adding heat to said liquid in said system;
  H. heat removal means for withdrawing heat from said liquid in said system; and
  I. pumping means for recirculating said liquid through said conduit grid, headers, heat supply means and heat removal means;
  whereby said phase change material may be alternately melted and frozen uniformly throughout the mass of said phase change material as heat is added to and withdrawn from the recirculating liquid in said system.

17. In a heat exchange system capable of transferring the heat of fusion of a stationary liquid/solid phase change material between a moving liquid in said system and said phase change material, apparatus as claimed in claim 16, in which:
  more than one grid of closely-spaced small diameter synthetic conduits are arranged within said tank to give multiple parallel liquid circuits through which said liquid can flow;
  whereby in case of a leak in one such grid of conduits rendering the heat exchange system inoperable and thereby causing the phase change material to cool and solidify, said leaking grid can be closed off and another grid in said tank can be used to circulate said liquid for heating and melting the phase change material so that the liquefied phase change material can be pumped out of the tank as a liquid to allow repairs to be carried out on said leaking grid.

18. In a heat exchange system capable of transferring the heat of fusion of a stationary liquid solid phase change material between a moving liquid in said system and said phase change material, apparatus as claimed in claim 16, in which:
  said spacer means is fibrous and low density and has sufficiently large spaces therein for permitting said free flow of the phase change material in its liquid state.

19. In a heat exchange system capable of transferring the heat of fusion of a stationary liquid-solid phase change material between a moving liquid in said system and said phase change material, apparatus as claimed in claim 18, in which:

said spaces in said spacer means are also sufficiently small for preventing crystals of the solidified phase change material from falling through to the bottom of the tank.

20. In a heat exchange system capable of transferring the heat of fusion of a stationary liquid-solid phase change material between a moving liquid in said system and said phase change material, apparatus as claimed in claim 16, in which:

said insulated tank is at least two feet in diameter and at least four feet high.

21. In a heat exchange system capable of transferring the heat of fusion of a stationary liquid-solid phase change material between a moving liquid in said system and said phase change material, apparatus as claimed in claim 20, in which:

said insulated tank is sufficiently large to hold 12 cubic feet of the phase change material.

22. The method of storing thermal energy and withdrawing it at a later time comprising the steps of:

A. providing an open-top container insulated on its outer surfaces;

B. outside of said container, fabricating a flexible grid containing a multiplicity of closely and uniformly spaced flexible small diameter conduits of synthetic material arranged to provide multiple parallel circuits for liquid flow;

C. connecting said conduits to supply and return headers;

D. positioning said flexible grid within said open-top container with said grid substantially uniformly spaced horizontally within said container and located throughout substantially the entire volume of said container;

E. providing a phase change material outside of said container and having a phase change temperature above the ambient temperature, and heating said material for causing said material to be in its liquid state;

F. substantially filling said container and surrounding said conduits with the phase change material in its liquid state while leaving a space in the top of said container for expansion and contraction of said phase change material;

G. covering said container with a tightly fitting top cover;

H. connecting said headers to pumping and heat exchange means;

I. filling said conduits, headers, pumping and heat exchange means with suitable heat exchange liquid;

J. recirculating the liquid through said conduits at a temperature below the phase change temperature causing the phase change material to solidify;

K. alternately adding heat to and withdrawing heat from the recirculating liquid causing said material alternately to melt and solidify around said multiplicity of conduits throughout the mass of said phase change material, whereby heat of fusion will alternately be stored in the phase change material and then released to the recirculating liquid; and whereby when the liquid is not flowing, the heat lost from the phase change material through the outer insulated wall of the tank will cause the phase change material adjoining said wall to solidify, thus preventing convection adjacent to the tank wall and creating additional insulation effect by the solidified material for impeding heat flow from the interior region of the material out through the solidified material adjacent to the insulated wall of the container.

23. The method of storing thermal energy and withdrawing it at a later time as claimed in claim 22, in which:

said step (E) of substantially filling said container and surrounding said conduits with a phase change material in its liquid state is carried out by the further steps of:

delivering the phase change material in its liquid state in a heated tank truck to the site where said container is located, and pumping the phase change material in its liquid state from the heated tank truck through a hose into said container.

24. Heat storage tank apparatus for temporarily storing heat energy comprising:

A. a thermally insulated tank providing convenient access to its interior;

B. liquid supply and return headers extending within said tank;

C. at least one grid of closely-spaced small diameter conduits of flexible plastic material connected at their ends to the respective headers and arranged within said tank to give multiple parallel liquid circuits through which a heat-transfer liquid can flow;

D. said grid being a rolled-up grid of closely-spaced parallel flexible parallel conduits having a vertical axis and the respective layers of said rolled-up grid having a spiral configuration as seen from above;

E. said liquid flow being in opposite directions in neighboring conduits in each respective layer of said spiral configuration;

F. a liquid/solid phase change material substantially filling said tank and surrounding said grid of closely-spaced small diameter conduits;

G. spacer means in said tank associated with said grid for providing substantially uniform horizontal spacing of said small diameter conduits of plastic material and permitting free flow of the phase change material in its liquid state throughout said tank;

H. said spacer means being a plurality of elongated members extending transversely to the conduits in said grid for holding said flexible plastic conduits in their closely-spaced parallel relationship in said rolled-up grid, and said elongated spacer members extending vertically in said tank; and I. said insulated tank, said flexible plastic conduits and said headers being formed of materials capable of withstanding temperature above and below the melting point of said liquid/solid phase change material;

whereby said phase change material may be alternately melted and frozen throughout the interior of the mass thereof as heat is added thereto or withdrawn therefrom by circulating heat-transfer liquid through said conduit grid.

25. Heat storage tank apparatus as claimed in claim 24, in which:

G. said grid is rolled into a spiral roll configuration as seen in cross section looking downwardly.

26. Heat storage tank apparatus as claimed in claim 25, in which:

H. said spacer means is low density matting having multiple spaces therein which has been rolled into said spiral roll configuration together with said grid, said matting and said grid being in alternate spiral layers as seen in cross section.

27. Heat storage tank apparatus as claimed in claim 25, in which:

I. said liquid supply and return headers extend generally vertically within said tank, and each of said conduits extends generally in a horizontal plane in a spiral having a reversal of direction near the center of said spiral roll configuration with the liquid flow in each conduit travelling generally in a horizontal plane from the supply header along an inward spiral path through the phase change material to said reversal of direction and then travelling in a generally horizontal plane along an outward spiral path through the phase change material, said outward spiral path being near to and vertically aligned with said inward spiral path.

28. Heat storage tank apparatus as claimed in claim 24, in which:

the density of the phase change material is greater than the rolled-up grid of plastic conduits together with said elongated spacer members whereby the grid and elongaged spacer members will tend to float up vertically when the phase change material is in its liquid state in said tank; and a rigid tank cover in retaining relationship with said elongated spacer members, whereby said rolled-up grid is prevented from rising up in spite of the buoyancy effect of the phase change material when it is in its liquid state.

29. Heat storage tank apparatus for temporarily storing heat energy comprising:

A. a thermally insulated tank providing convenient access to its interior;

B. liquid supply and return headers extending within said tank;

C. at least one grid of closely-spaced small diameter conduits of flexible plastic material connected at their ends to the respective headers and arranged within said tank to give multiple parallel liquid circuits through which a heat-transfer liquid can flow;

D. a liquid/solid phase change material substantially filling said tank and surrounding said grid of closely-spaced small diameter conduits;

E. spacer means in said tank associated with said grid for providing substantially uniform horizontal spacing of said small diameter conduits of plastic material and permitting free flow of the phase change material in its liquid state throughout said tank;

F. means for preserving a small portion of the phase change material in its solid state in contact with the main body of the phase change material, when the phase change material is being changed into its liquid state by adding heat energy thereto, thereby preserving frozen crystals of the phase change material for serving nucleation purposes when the phase change material is later being changed into its solid state by extracting heat energy therefrom;

G. said insulated tank, said flexible plastic conduits and said headers being formed of materials capable of withstanding temperature above and below the melting point of said liquid/solid phase change material;

whereby said phase change material may be alternately changed into a liquid state and changed into a solid state throughout the interior of the mass thereof as heat energy is added thereto or withdrawn therefrom by circulating heat-transfer liquid through said conduit grid.

30. Heat storage tank apparatus for temporarily storing heat energy comprising:

A. a thermally insulated tank providing convenient access to its interior;

B. liquid supply and return headers extending within said tank;

C. at least one grid of closely-spaced small diameter conduits of flexible plastic material connected at their ends to the respective headers and arranged within said tank to give multiple parallel liquid circuits through which a heat-transfer liquid can flow;

D. a liquid/solid phase change material substantially filling said tank and surrounding said grid of closely-spaced small diameter conduits;

E. circulating means for causing circulation of the phase change material in its liquid state in said tank for preventing stratification of the phase change material in said tank when in its liquid state;

F. spacer means in said tank associated with said grid for providing substantially uniform horizontal spacing of said small diameter conduits of plastic material and permitting free flow of the phase change material in its liquid state throughout said tank;

G. said insulated tank, said flexible plastic conduits and said headers being formed of materials capable of withstanding temperature above and below the melting point of said liquid/solid phase change material;

whereby said phase change material may be alternately changed into a liquid state and changed into a solid state throughout the interior of the mass thereof as heat energy is added thereto or withdrawn therefrom by circulating heat-transfer liquid through said conduit grid.

31. Heat storage tank apparatus for temporarily storing heat energy comprising:

A. a thermally insulated tank providing convenient access to its interior;

B. liquid supply and return headers extending within said tank;

C. at least one grid of closely-spaced small diameter conduits of flexible plastic material connected at their ends to the respective headers and arranged within said tank to give multiple parallel liquid circuits through which a heat-transfer liquid can flow;

D. a liquid/solid phase change material substantially filling said tank and surrounding said grid of closely-spaced small diameter conduits;

E. spacer means in said tank associated with said grid for providing substantially uniform horizontal spacing of said small diameter conduits of plastic material and permitting free flow of the phase change material in its liquid state throughout said tank;

F. said insulated tank, said flexible plastic conduits and said headers being formed of materials capable of withstanding temperature above and below the melting point of said liquid/solid phase change material;

whereby said phase change material may be alternately melted and frozen throughout the interior of the mass thereof as heat is added thereto or withdrawn therefrom by circulating heat-transfer liquid through said conduit grid;

G. means for preventing stratification of the phase change material when in its liquid state including;

H. impelling means for circulating the liquid in the tank; and

I. motor means connected to said impelling means for driving the impelling means whenever the phase change material is in its liquid state.

32. Heat storage tank apparatus as claimed in claim 31, in which:

said motor means is a relatively low power electric motor having a relatively low starting torque; and electric power is continuously fed to said motor for automatically causing the impelling means to operate whenever the phase change material surrounding the impelling means is liquid.

33. Heat storage tank apparatus as claimed in claim 31 or 32, in which:

said impelling means has a conduit associated therewith extending in an upright direction in the tank;

said conduit having an opening at its lower end near the bottom of the tank communicating with the interior of the tank, and said impelling means being arranged to impel liquid phase change material downwardly through said conduit for causing the liquid phase change material to exit from the lower end of said conduit and then to rise throughout the tank so as to return to the impelling means to be recirculated.

34. Heat storage tank apparatus as claimed in claim 31 or 32, in which:

said tank is generally cylindrical in configuration and has its axis upright;

said impelling means has a recirculation conduit associated therewith extending upright along the axis of the tank;

said conduit communicates at its upper and lower ends with the phase change material in the top and bottom of the tank, respectively;

said impelling means is arranged to impel liquid phase change material downwardly through said conduit for causing the liquid PCM to rise through the volume of the tank surrounding said conduit for producing recirculation thereof back to the upper end of said conduit;

said grid of closely spaced small diameter flexible conduits arranged in a roll surrounding said recirculation conduit with many spiral turns; and said spacing means approximately uniformly horizontally spaces the respective spiral turns of said grid.

35. The method of making thermal energy storage apparatus comprising the steps of:

A. providing an open-top container insulated on its outer surfaces;

B. outside of said container, forming a rectangular flexible grid containing a multiplicity of flexible small diameter conduits of synthetic plastic material, arranged in spaced parallel relationship;

C. connecting said conduits to supply and return headers extending transversely across said grid to provide multiple parallel circuits for liquid flow through said conduits from said supply to said return header;

D. positioning a plurality of rigid support members transversely of said mat and and engaging said conduits for holding the conduits in their spaced parallel relationship;

E. rolling up said grid together with said support members forming said grid into a spiral roll configuration with said conduits and support members being in alternate layers as seen in the axial direction of the spiral roll and with said support members and said supply and return headers extending in the axial direction;

F. placing said spiral roll configuration in said container with the axis of said spiral roll configuration extending vertically within the container;

G. supplying a liquid/solid phase change material at a temperature to be in its liquid state and flowing said material into the container for filling the container and surrounding said grid; and H. covering said container with a tightly fitting top cover.

36. The method for freezing ice solid in a vertical cylindrical plastic tank without creating lateral expansion forces in the tank for cooling storage for use in air conditioning a building using electrical energy at "off peak" rates including the steps of:

uniformly spacing a grid of small diameter spaced flexible plastic tubes within and substantially throughout the tank in the main lower portion of said tank;

arranging said tubes to give multiple parallel circuits with opposite direction of liquid flow in adjoining tubes;

connecting said tubes to supply and return headers;

filling said tank with water in the main lower portion of said tank while leaving the top portion of the tank free of water to accommodate expansion as the water is frozen into solid ice in the tank;

connecting said headers through electrically energized pumping and refrigeration means located outside of said tank and arranged for refrigerating anti-freeze liquid;

electrically energizing said pumping and heat exchange means during "off peak" hours of a 24 hour day for recirculating the anti-freeze liquid through said tubes at a temperature below the freezing point of water for causing the water in said plastic tank to freeze to solid ice around all of said adjoining tubes uniformly throughout the whole volume of water in said tank during said "off peak" hours;

said freezing of the water to solid ice around all of said adjoining tubes throughout the whole volume of water in said tank squeezing the extra water volume upwardly due to expansion of the freezing ice and thereby preventing rupture of the plastic tank as the whole volume of water freezes to solid ice;

during daylight hours when air conditioning is desired in the building recirculating the anti-freeze liquid through said tubes embedded in said solid ice and through second heat exchange means;

blowing building air past said second heat exchange means for cooling the building air by transferring heat energy from the building air into said recirculating liquid and for transferring heat energy from said recirculating liquid into the ice in said tank;

thereby providing air conditioning in the building while avoiding the use of electrical energy during hours of "peak" rates, and thereby advantageously avoiding rupture of the tank even though the water is frozen solid therein.

* * * * *